(12) United States Patent
Vanni et al.

(10) Patent No.: US 9,032,720 B2
(45) Date of Patent: May 19, 2015

(54) TORQUE CONVERTER ASSEMBLY CENTERING FEATURES

(75) Inventors: Jeremy Vanni, Sterling, OH (US); Brian C. Zaugg, Millersburg, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 632 days.

(21) Appl. No.: 13/312,115

(22) Filed: Dec. 6, 2011

(65) Prior Publication Data

US 2012/0151908 A1    Jun. 21, 2012

Related U.S. Application Data

(60) Provisional application No. 61/425,430, filed on Dec. 21, 2010.

(51) Int. Cl.
*F16J 1/00* (2006.01)
*F16H 45/02* (2006.01)

(52) U.S. Cl.
CPC ........ *F16H 45/02* (2013.01); *F16H 2045/0205* (2013.01); *F16H 2045/0231* (2013.01); *F16H 2045/0278* (2013.01)

(58) Field of Classification Search
CPC ..... F16H 41/24; F16H 45/02; F16H 2021/24; F16H 2045/0221; F16H 2045/0205; F16H 2045/0231; F16H 2045/0278; F16D 33/14
USPC ................. 60/364, 338, 330; 192/3, 28, 3.29
See application file for complete search history.

(56) References Cited

U.S. PATENT DOCUMENTS

| | | | | |
|---|---|---|---|---|
| 5,186,292 | A * | 2/1993 | Hageman et al. | 192/3.28 |
| 6,142,272 | A | 11/2000 | Meisner et al. | |
| 7,454,902 | B2 * | 11/2008 | Fukunaga et al. | 60/361 |
| 2004/0226794 | A1 * | 11/2004 | Sasse et al. | 192/3.29 |
| 2008/0023286 | A1 * | 1/2008 | Matsumoto et al. | 192/3.29 |
| 2008/0078638 | A1 * | 4/2008 | Degler et al. | 192/3.3 |
| 2009/0125202 | A1 * | 5/2009 | Swank et al. | 701/68 |

* cited by examiner

*Primary Examiner* — Dwayne J White
*Assistant Examiner* — Logan Kraft
(74) *Attorney, Agent, or Firm* — Simpson & Simpson, PLLC

(57) ABSTRACT

An assembly for centering components with respect to an axis of rotation of a torque converter during installation of the torque converter on a transmission input shaft, the assembly including a cover for receiving a torsional input, a piston housed within the cover, a damper housed within the cover, the damper including a damper cover plate and a damper flange, wherein the piston, the damper cover plate, or the damper flange includes an extension, wherein the extension is operatively arranged for providing a centering function of the piston, the damper cover plate, or the damper flange by limiting a maximum radial distance a second axis of the piston, the damper cover plate, or the damper flange can become misaligned from the axis of rotation of the torque converter.

11 Claims, 6 Drawing Sheets

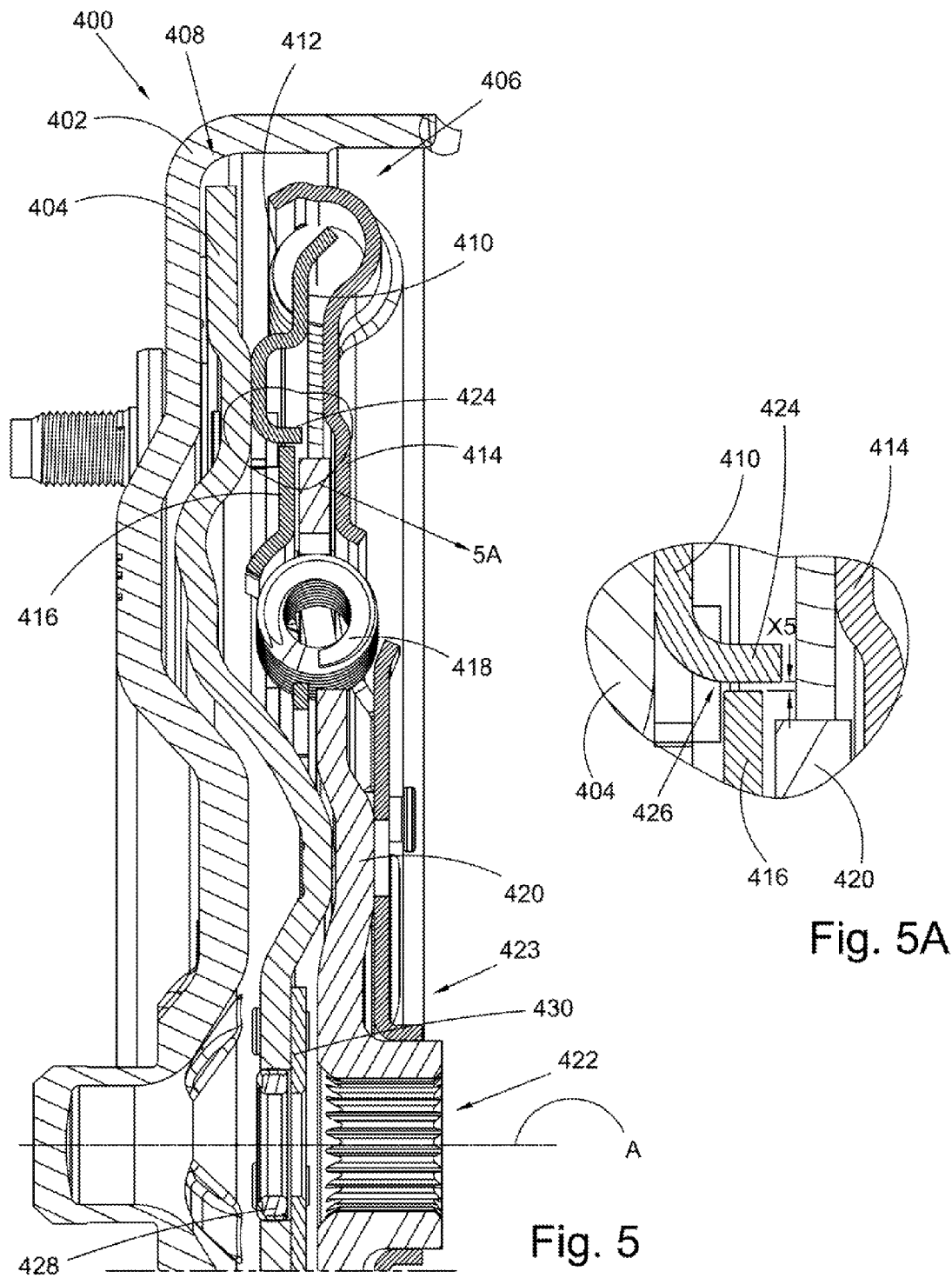

TORQUE CONVERTER ASSEMBLY CENTERING FEATURES

CROSS-REFERENCE TO RELATED APPLICATIONS

This application claims the benefit under 35 U.S.C. §119 (e) of U.S. Provisional Application No. 61/425,430 filed Dec. 21, 2010, which application is incorporated herein by reference.

FIELD OF THE INVENTION

The invention broadly relates to torque converters, more specifically to features for centering components during assembly of a torque converter.

BACKGROUND OF THE INVENTION

Torque converters are well known in the art. During assembly of a torque converter, typically the components are first preassembled before being installed on a transmission input shaft. That is, for example, a first half or portion of the torque converter cover is laid so that the engine side faces downward, forming a dish for receiving the other components. For example, the piston, damper components, turbine shell, stator, pump shell/cover, etc., are laid into the first cover portion, such that the common axis of the components is arranged in a generally vertical direction. The pump shell/cover is connected to the first cover portion, typically by welding, for sealing the preassembly. After all of the necessary components are housed within the cover, the entire preassembly is rotated ninety degrees so that the central axis of the torque converter preassembly is arranged horizontally. The preassembly is then installed on an input shaft for a transmission by sliding the preassembly onto the input shaft in the horizontal (and axial) direction. However, due to the force of gravity, some of the internal components of the torque converter drop or shift in the radial direction with respect to the axis of rotation of the torque converter, such that some components become misaligned with respect to the axis of rotation. Accordingly, when sliding the torque converter preassembly on the input shaft, the input shaft may bump into components instead of sliding through a central bore therein. This can significantly increase the difficulty and time required to assemble a torque converter in an automobile, because the input shaft and torque converter components need to be manually manipulated by a factory worker in order to fully install the torque converter preassembly on the input shaft, instead of being installed automatically by an assembly robot, for example.

BRIEF SUMMARY OF THE INVENTION

The present invention broadly comprises an assembly for centering components with respect to an axis of rotation of a torque converter during installation of the torque converter on a transmission input shaft, the assembly including a cover for receiving a torsional input, the cover centered on the axis, a piston housed within the cover, a damper housed within the cover, the damper including a damper cover plate and a damper flange, wherein the piston, the damper cover plate, or the damper flange includes an extension, wherein the extension is operatively arranged for providing a centering function of the piston, the damper cover plate, or the damper flange by limiting a maximum radial distance a second axis of the piston, the damper cover plate, or the damper flange can become misaligned from the axis of rotation of the torque converter.

In one embodiment, the damper cover plate includes the extension, and the extension extends radially outward from the damper cover plate toward the cover, wherein the maximum radial distance is defined by a radial gap formed between the extension and a surface of the cover when the damper cover plate is centered on the axis. In one embodiment, the maximum radial distance is between approximately 0.5 mm and 1.5 mm. In one embodiment, at least one leaf spring is secured between the piston and the cover for centering the piston with respect to the axis. In one embodiment, the damper cover plate includes the extension, and the extension extends radially outward from the damper cover plate toward the piston, wherein the maximum radial distance is defined by a radial gap formed between the extension and a surface of the piston when the damper cover plate is centered on the axis, wherein the surface is arranged substantially parallel to the axis. In one embodiment, the damper cover plate includes the extension, and the extension extends radially inward from the damper cover plate toward the piston, wherein the maximum radial distance is defined by a radial gap formed between the extension and the and a surface of the piston when the damper cover plate is centered on the axis, wherein the surface is arranged substantially parallel to the axis. In one embodiment, the damper flange includes the extension, and the extension extends axially from the damper flange toward the piston, wherein the maximum radial distance is defined by a radial gap formed between the extension and a surface of the piston when the damper flange is centered on the axis, wherein the surface is arranged substantially parallel to the axis.

In one embodiment, the piston includes an input plate for the damper, wherein the input plate is non-rotatably secured to the piston, wherein the input plate includes the extension, wherein the extension extends axially from the piston toward the damper cover plate, wherein the maximum radial distance is defined by a radial gap formed between the extension and the damper cover plate. In one embodiment, the piston is sealed on the transmission input shaft with a seal, wherein the piston includes a protection plate affixed thereto, wherein the protection plate is operatively arranged to engage about the transmission input shaft for limiting radial movement of the piston with respect to the transmission input shaft for reducing wear on the seal. In one embodiment, the piston is sealed directly against the transmission input shaft and the damper flange is engaged with the transmission input shaft via a splined connection.

The current invention also broadly comprises an assembly for a torque converter for centering components with respect to a central axis, the assembly including a cover centered on the central axis, a first component housed within the cover, a second component housed within the cover, wherein the first component or the second component includes an extension for providing a centering function of the first component or the second component with respect to the axis by limiting a maximum radial distance a second axis of the first component or the second component can be misaligned from the axis. In one embodiment, the second component includes the extension, and the extension extends radially outward from the second component toward the cover, wherein the maximum radial distance is defined by a radial gap formed between the extension and the cover when the second component is centered on the axis. In one embodiment, the maximum radial distance is between approximately 0.5 mm and 1.5 mm. In one embodiment, the first component is secured to the cover for centering the first component with respect to the central axis.

In one embodiment, the second component includes the extension, and the extension extends radially outward from the second component toward the first component, wherein the maximum radial distance is defined by a radial gap formed between the extension and the first component when the second component is centered on the axis. In one embodiment, the second component includes the extension, and the extension extends radially inward from the second component toward the first component, wherein the maximum radial distance is defined by a radial gap formed between the extension and the first component when the second component is centered on the axis. In one embodiment, the second component includes the extension, and the extension extends axially from the second component toward the first component, wherein the maximum radial distance is defined by a radial gap formed between the extension and the first component when the second component is centered on the axis.

In one embodiment the first component includes an input plate for the damper, wherein the input plate is non-rotatably secured to the first component, wherein the input plate includes the extension, wherein the extension extends axially from the first component toward the second component, wherein the maximum radial distance is defined by a radial gap formed between the extension and the second component. In one embodiment, the first component is sealed on the transmission input shaft with a seal, wherein the first component includes a protection plate affixed thereto, wherein the protection plate is operatively arranged to engage about the transmission input shaft for limiting radial movement of the first component with respect to the transmission input shaft for reducing wear on the seal. In one embodiment, the first component is sealed directly against the transmission input shaft and the second component is engaged with the transmission input shaft via a splined connection.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 5 is a cross-sectional view of a centering feature according to a fifth embodiment of the current invention;

FIG. 5A is an enlarged view of the centering feature of FIG. 5;

DETAILED DESCRIPTION OF THE INVENTION

Figure 1:
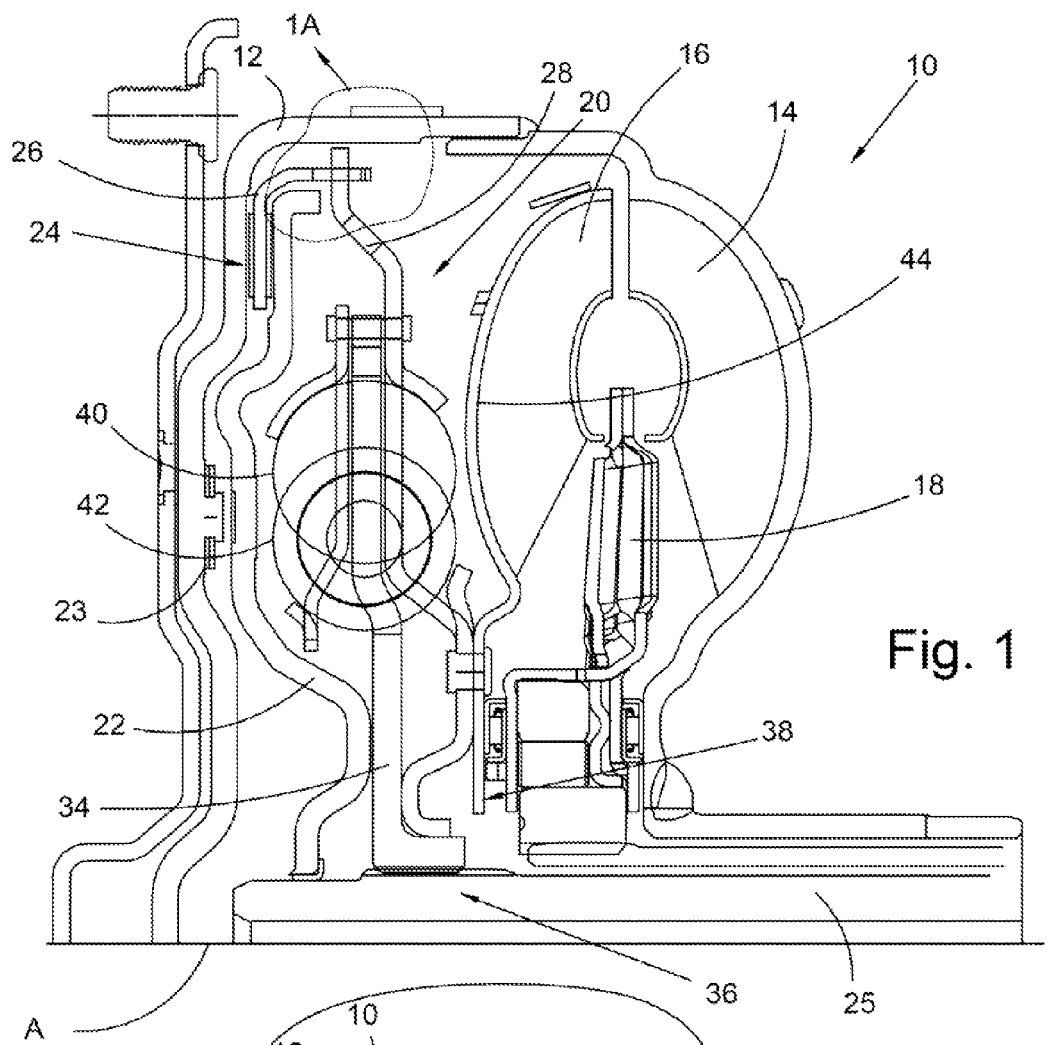
FIG. 1 is a cross-sectional view of a torque converter having a centering feature according to a first embodiment of the current invention.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims. It is also understood that any reference to axial, radial, or circumferential directions, surfaces, or properties is made with respect to the axis of rotation shown in the drawings, indicated generally as axis A.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
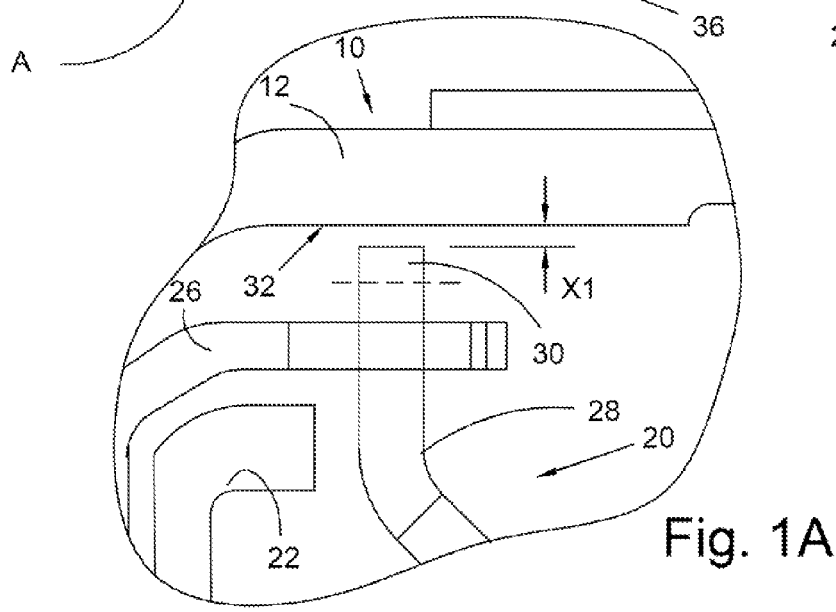
FIG. 1A is an enlarged view of the centering feature of FIG. 1.

Referring now to the figures, FIGS. 1 and 1A show torque converter 10 arranged, for example, with cover 12 connected to an engine or other torsional input (not shown), the torque converter also having impeller 14, turbine 16, stator 18, and vibration damper 20 for hydraulically transferring torque through the torque converter. These components are shown for purposes of discussion, and could be replaced by any type or style of cover, impeller, turbine, stator, and/or vibration damper known in the art, and in some embodiments, some of these components may not even be included.

Torque converter 10 also includes piston 22, which is connected to cover 12 via leaf springs 23. It should be appreciated that shown in cross-section, it can not be seen that the leaf springs connect between the cover and piston, however various arrangements connecting the piston to the cover are well known in the art and these arrangement do not require further description. Piston 22 is included to engage clutch 24 in response to pressurizing a pressure medium, such as oil, in the various chambers of the torque converter on opposite axial sides of the piston. Clutch 24 is a lock-up clutch for mechanically coupling transmission input shaft 25 to cover 12 (and the torsional input). Specifically, clutch 24 includes plate 26 which is rotationally fixed to cover plate 28 of damper 20 and selectively engageable between piston 22 and cover 12.

Axis A for shaft 25 is centered with respect to cover 12, so the cover is inherently aligned along axis A. Due to the connection of leaf springs 23 between cover 12 and piston 22, the piston is also largely centered on axis A, although some minor degree of sagging or dropping in the radial direction may occur when the torque converter is being installed on shaft 25. Damper 20, however, is not connected to the piston or the cover, and therefore, it is not centered when the torque converter is being slid onto input shaft 25, and can become radially misaligned with axis A, piston 22, and cover 12, which can increase the difficulty of installing torque converter 10 on shaft 25.

Typically, torque converters include a turbine hub which engages with both the piston and the damper flange. As can be seen from FIG. 1, torque converter 10 is a new design which does not include a turbine hub. Thus, piston 22 and flange 34 of damper 20 are directly engaged with transmission input shaft 25. It can be seen that the piston is sealed against shaft 25, such that the piston can move axially along the shaft, while flange 34 is engaged with shaft 25 at splined connection 36. In prior art torque converters, which include a turbine hub, both the damper flange and the piston are engaged with the hub, so only the hub interacts directly with the transmission input shaft, and therefore, only the hub needs to be centered on the input shaft. Furthermore, the turbine hub in prior art torque converters is engaged in a central bore of the piston, which provides centering for the hub because the piston is connected to the cover via leaf springs, and the damper is positioned on the hub, which accordingly provides centering for the damper. However, in this embodiment, without a turbine hub, the piston and damper flange are moveable independently of each other during installation, and therefore both need to be separately centered on input shaft 25.

In FIG. 1A, it can be seen that cover plate 28 of damper 20 includes extension 30. The boundary defining the portion that is considered extension 30 is indicated generally by a dashed line. That is, prior art torque converters would terminate at a maximum outer radial position approximately at the location of the dashed line in FIG. 1A, in order to ensure that plate 26 and plate 28 couple sufficiently together without using unnecessary material. The inclusion of extension 30 creates radial gap or distance X1 between inner surface 32 of cover 12 and the outer circumference of extension 30.

Surface 32 is arranged substantially parallel to axis of rotation A of torque converter 10, such that surface 32 forms a substantially cylindrically shaped surface about axis A. Advantageously, this provides a flat surface against which extension 30 can contact for limiting the amount of radial misalignment the damper can have with respect to axis A. In other words, surface 32 acts as a stop for extension 30, and therefore damper 20, in order to set a maximum amount of radial misalignment between axis A and components of the damper. Specifically, it can be seen that cover plate 28 includes feature 38 for supporting flange 34 in the radial direction with respect to the cover. Generally, feature 38 comprises an axial portion or tube of the damper cover engaged about an axial portion or tube of the damper flange. Thus, flange 34 includes an axial portion which is engaged in a central bore of cover plate 28, thereby limiting the radial movement of flange 34. In this way, extension 30 and surface 32 of cover 12 provide a centering function for plate 28, which in turn sets a centering function for damper flange 34, such that input shaft 25 engages smoothly with flange 34 at splined connection 36 during installation of the torque converter on the input shaft.

It should be appreciated that springs 40 and 42 are engaged in windows in cover plate 28 and flange 34 for transferring torque between the cover and flange in a manner generally known in the art. Thus, the contact between the springs and the edges of the windows of the cover plate and flange may be used to limit radial movement between the cover plate and damper flange in addition to or in lieu of feature 38. Furthermore, it should be appreciated that plate 28 is riveted or otherwise secured to shell 44 of turbine 16 for also setting the radial position of the turbine.

Figure 2:
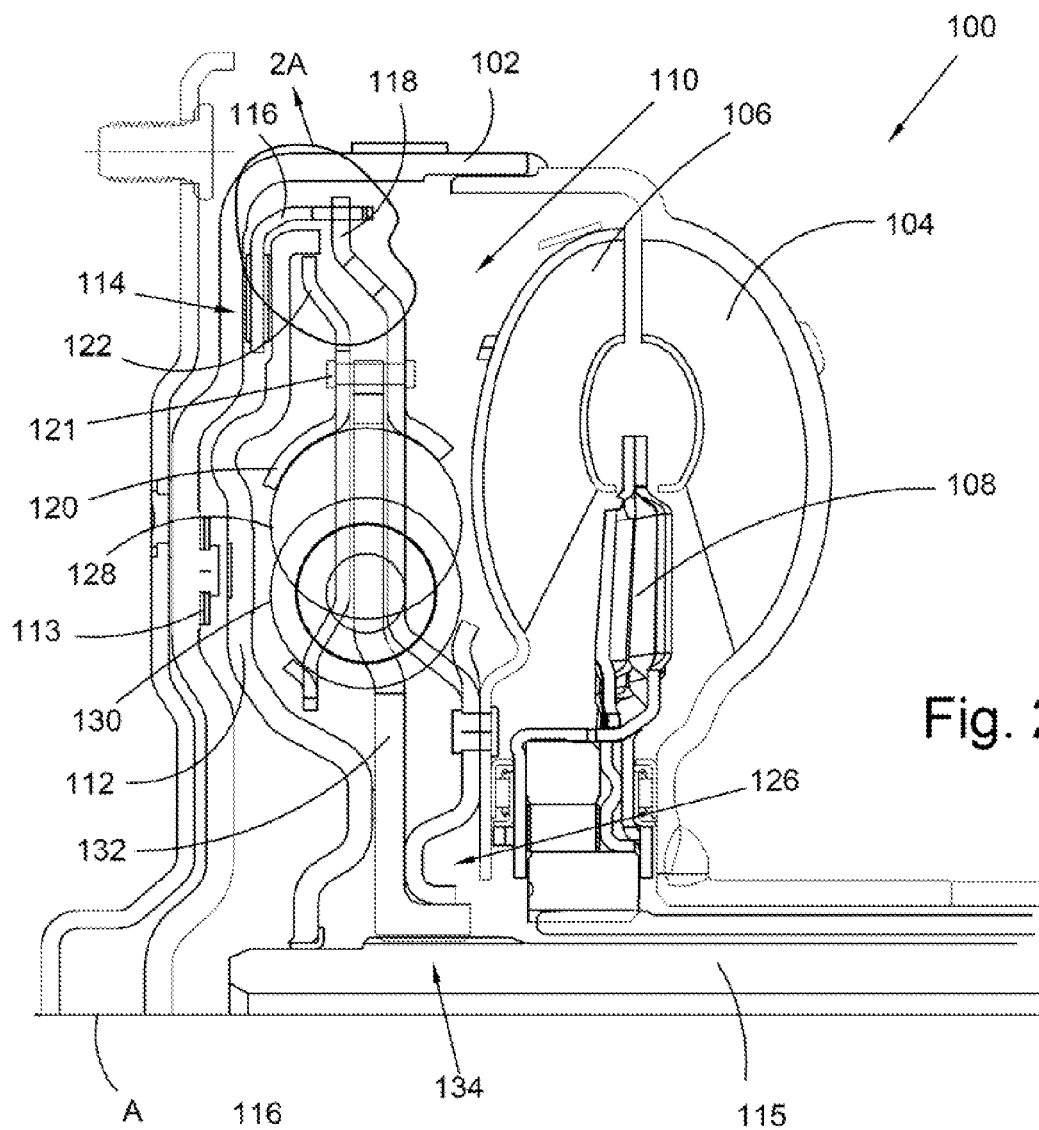
FIG. 2 is a cross-sectional view of a torque converter having a centering feature according to a second embodiment of the current invention.
Figure 2A:
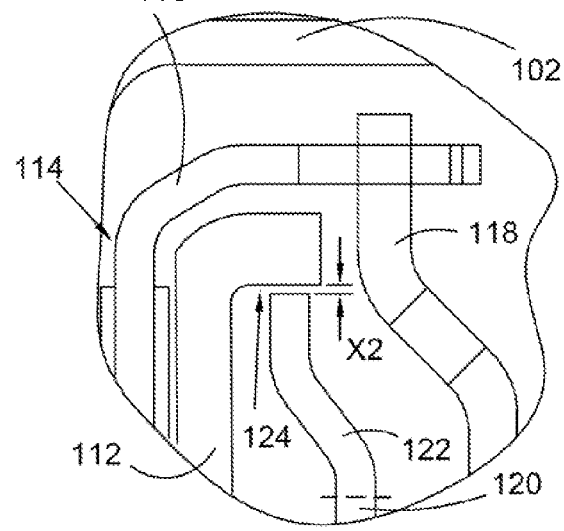
FIG. 2A is an enlarged view of the centering feature of FIG. 2.

A second embodiment is shown in FIGS. 2 and 2A, which illustrates torque converter 100 arranged, for example, with cover 102 connected to an engine or other torsional input (not shown), the torque converter also having impeller 104, turbine 106, stator 108, and vibration damper 110 for hydraulically transferring torque through the torque converter. Like torque converter 10, these components are shown for purposes of discussion, and could be replaced by any type or style of cover, impeller, turbine, stator, and/or vibration damper known in the art, and in some embodiments, some of these components may not even be included.

Also like torque converter 10, torque converter 100 includes piston 112 that is connected to cover 102 via leaf springs 113, and wherein the piston is arranged for selectively engaging clutch 114. Clutch plate 116 is non-rotatably secured to cover plate 118 of damper 110 for mechanically coupling input shaft 115, via damper 110, to the cover and torsional input when clutch 114 is engaged. A second damper cover plate, cover plate 120 is connected to cover plate 118 via rivet 121. Like cover plate 28 of torque converter 10, cover plate 120 includes extension 122 for providing a centering function. Extension 122 extends outwardly from plate 120 in the radial direction to create gap X2 between the outer circumference of the extension and surface 124 of piston 112. Like surface 32, surface 124 is arranged substantially parallel to axis A for acting as a hard, flat stop against which extension 122 can contact for limiting misalignment of damper 110 in the radial direction with respect to axis A. It should be appreciated that surface 124 is arranged on the piston, not the cover, like surface 32. However, since the piston is fixed to the cover with leaf springs, the piston also provides sufficient centering with respect to the center for enabling smooth installation of torque converter 100 on input shaft 115.

Like the corresponding components of torque converter 10, some combination of feature 126 and springs 128 and 130 provides radial support of flange 132 with respect to covers 118 and 120. Thus, extension 122 provides a centering function for the damper cover, which provides centering for the damper flange, such that the damper flange can engage smoothly with transmission input shaft 115 at splined connection 134 during installation of the torque converter on the input shaft.

Figure 3:
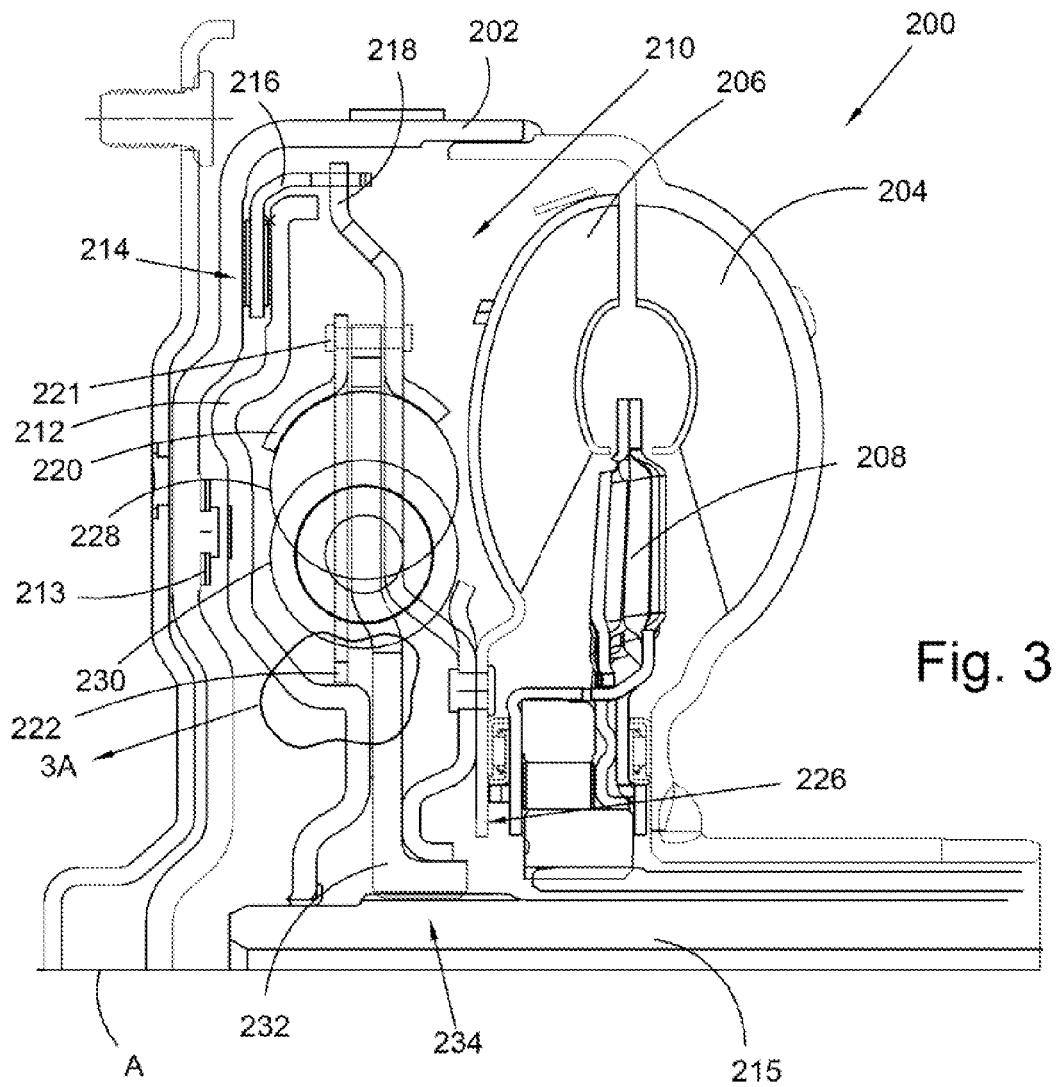
FIG. 3 is a cross-sectional view of a torque converter having a centering feature according to a third embodiment of the current invention.
Figure 3A:
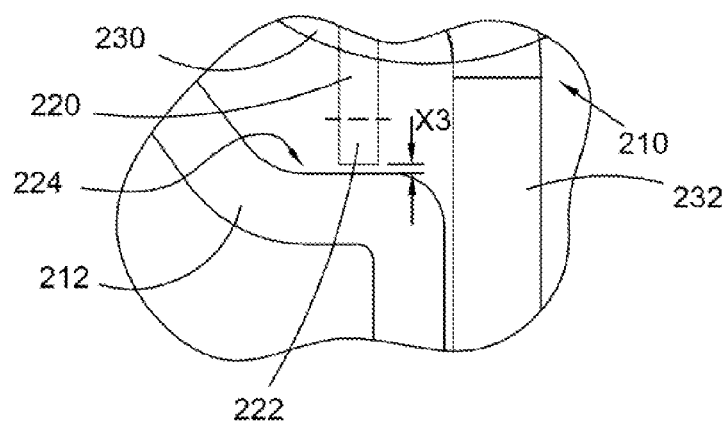
FIG. 3A is an enlarged view of the centering feature of FIG. 3.

A third embodiment is shown in FIGS. 3 and 3A, which illustrates torque converter 200 arranged, for example, with cover 202 connected to an engine or other torsional input (not shown), the torque converter also having impeller 204, turbine 206, stator 208, and vibration damper 210 for hydraulically transferring torque through the torque converter. Like torque converters 10 and 100, these components are shown for purposes of discussion, and could be replaced by any type or style of cover, impeller, turbine, stator, and/or vibration damper known in the art, and in some embodiments, some of these components may not even be included.

Also like torque converters 10 and 100, torque converter 200 includes piston 212 that is connected to cover 202 via leaf springs 213, and wherein the piston is arranged for selectively engaging clutch 214. Clutch plate 216 is non-rotatably secured to cover plate 218 of damper 210 for mechanically coupling input shaft 215, via damper 210, to the cover and torsional input when clutch 214 is engaged. A second damper cover plate, cover plate 220 is connected to cover plate 218 via rivet 221. Like cover plate 28 of torque converter 10 and cover plate 120 of torque converter 100, cover plate 220 includes extension 222 for providing a centering function. Extension 222 extends inwardly from plate 220 in the radial direction to create gap X3 between the outer circumference of the extension and surface 224 of piston 212. Like surface 32 and surface 124, surface 224 is arranged substantially parallel to axis A for acting as a hard, flat stop against which extension 222 can contact for limiting misalignment of damper 210 in the radial direction with respect to axis A. It should be appreciated that, like surface 124, surface 224 is arranged on the piston, not the cover, like surface 32. Since the piston is fixed to the cover with leaf springs, the piston also provides sufficient centering with respect to the center for enabling smooth installation of torque converter 200 on input shaft 215.

Like the corresponding components of torque converters 10 and 100, some combination of feature 226 and springs 228 and 230 provides radial support of flange 232 with respect to covers 218 and 220. Thus, extension 222 provides a centering function for the damper cover, which provides centering for the damper flange, such that the damper flange can engage smoothly with transmission input shaft 215 at splined connection 234 during installation of the torque converter on the input shaft.

Figure 4:
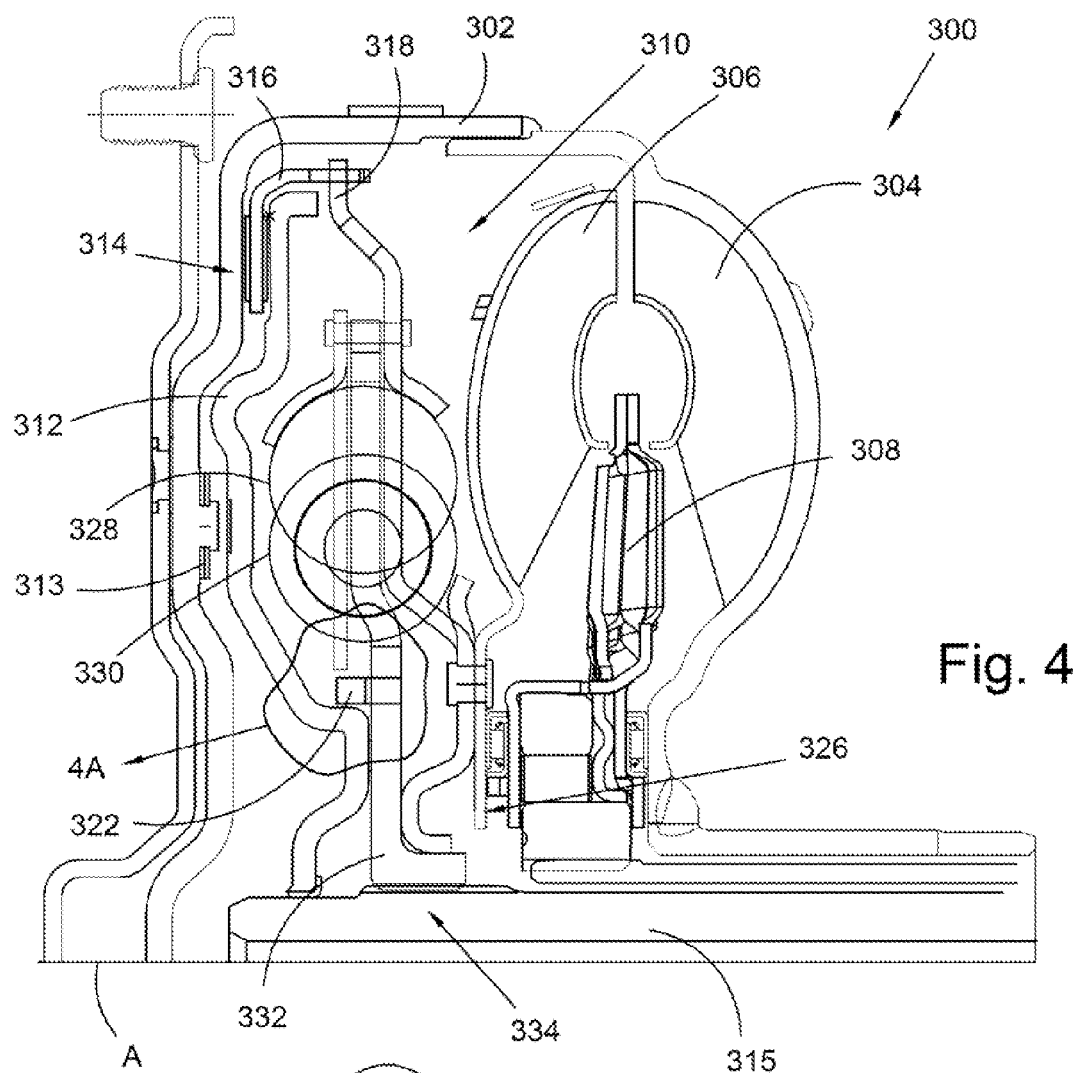
FIG. 4 is a cross-sectional view of a torque converter having a centering feature according to a fourth embodiment of the current invention.
Figure 4A:
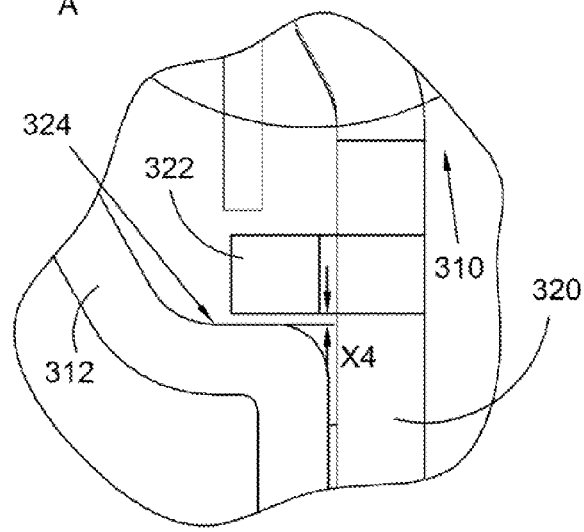
FIG. 4A is an enlarged view of the centering feature of FIG. 4.

A fourth embodiment is shown in FIGS. 4 and 4A, which illustrates torque converter 300 arranged, for example, with cover 302 connected to an engine or other torsional input (not shown), the torque converter also having impeller 304, turbine 306, stator 308, and vibration damper 310 for hydraulically transferring torque through the torque converter. Like torque converters 10, 100, and 200, these components are shown for purposes of discussion, and could be replaced by any type or style of cover, impeller, turbine, stator, and/or vibration damper known in the art, and in some embodiments, some of these components may not even be included.

Also like torque converters 10, 100, and 200 torque converter 300 includes piston 312 that is connected to cover 302 via leaf springs 313, and wherein the piston is arranged for selectively engaging clutch 314. Clutch plate 316 is non-rotatably secured to cover plate 318 of damper 310 for mechanically coupling input shaft 315, via damper 310, to the cover and torsional input when clutch 314 is engaged. Like cover plate 28 of torque converter 10, cover plate 120 of torque converter 100, and cover plate 220 of torque converter 200, damper flange 320 includes extension 322 for providing a centering function. Unlike extensions 30, 122, and 222, extension 322 does not extend in the radial direction, but instead extends axially in the form of a tab, rib, or protrusion, from damper flange 320 to create gap X4 between the outer circumference of extension 322 and surface 324 of piston 312. Piston 312 and surface 324 substantially resemble piston 212 and surface 224. Thus, like surface 32, surface 124, and surface 224, surface 324 is arranged substantially parallel to axis A for acting as a hard, flat stop against which extension 322 can contact for limiting misalignment of damper 210 in the radial direction with respect to axis A. It should be appreciated that, like surfaces 124 and 224, surface 324 is arranged on the piston, not the cover, like surface 32. Since the piston is fixed to the cover with leaf springs, the piston also provides sufficient centering with respect to the center for enabling smooth installation of torque converter 300 on input shaft 315.

It should be appreciated that in torque converter 300 the damper flange, not a damper cover plate, includes the extension which provides the centering function. Accordingly, just as features 38, 126, and 226 provided radial support for damper flanges 34, 132, and 232 of torque converters 10, 100, and 200, respectively, damper flange 320 of torque converter 300 provides radial support for the damper cover, such as cover plate 318 via the engagement of the damper flange with the cover plate at feature 326 and/or through springs 328 and 330. Thus, extension 322 provides a centering function for the damper flange, which provides centering for the damper cover, such that the damper cover is properly housed in the torque converter, and the damper flange can engage smoothly with transmission input shaft 315 at splined connection 334 during installation of the torque converter on the input shaft.

FIGS. 5 and 5A illustrates a fifth embodiment of centering feature according to the current invention. Specifically, a portion of torque converter 400 is shown including engine side cover 402, piston 404, and damper 406. Like the torque converters of FIGS. 1-4, torque converter 400 does not include a turbine hub, so the piston and damper are independently moveable and must be separately engaged with the transmission input shaft (not shown in FIG. 5), which is installed along axis A. The hydraulic torque transferring components (e.g., turbine, impeller, stator, etc.) are not shown as they could be generally arranged in any manner known in the art. Unlike the torque converters shown in FIGS. 1-4, piston 404 of torque converter 400 is not connected to cover 402 via leaf springs, so the piston is not centered with respect to the cover or axis A. Thus, unlike the previous embodiments, piston 404 of the embodiment of FIGS. 5 and 5A is centered by damper 406 instead of the other way around.

Lockup clutch 408 is closed by engaging the piston directly against the cover. Accordingly, piston 404 includes damper input plate 410 non-rotatably affixed thereto for coupling damper 406 directly with cover 402. The input plate could be non-rotatably affixed to the piston by any means known in the art, such as welding, rivets, bolts, or being integrally formed therewith. In a manner generally known in the art, input plate 410 includes tabs that engage with springs 412, which springs are also engaged in windows of damper cover plate 414 for transferring torque from the piston and/or input plate to the damper cover via springs 412. Damper cover plate 414 is connected non-rotatably to a second damper plate, namely damper plate 416, via rivets or the like. Windows in cover plates 414 and 416 engage with springs 418, which springs are engaged with windows in damper flange 420 for transferring torque from the damper cover to the damper flange via springs 418. The damper flange is non-rotatably fixed to the transmission input shaft via splines 422 similar to the previous embodiments. Similar to the other embodiments discussed herein, the damper cover and damper flange are fixed with respect to each other in the radial direction by feature 423, which generally comprises an axial portion of the damper cover secured about an axial portion of the damper flange.

As shown in more clarity in FIG. 5A, input plate 410 includes extension 424. Like the extensions of FIGS. 1-4A, extension 424 provides a centering function for components of torque converter 400. Specifically, extension 424 extends in the axial direction to create surface 426 against which the outer circumferential surface of cover 416 can engage. Like surfaces 32, 124, 224, and 324, surface 426 is arranged substantially parallel to axis A for acting as a hard, flat stop against which cover plate 416 can contact for limiting misalignment of damper 406 in the radial direction with respect to axis A. In this way, extension 424 interacts with cover 416 to set a maximum distance, namely distance X5, that damper cover 416 can become misaligned with respect to axis A. Extension 424 may also extend inward in the radial direction from plate 410 to shorten distance X5.

It should be appreciated that the centering function of torque converter 400 is provided between two components which are not connected to the cover, namely, the piston and damper. However, it is still advantageous to center the piston with respect to the damper for several reasons. First, the damper flange engages with the transmission input shaft first during assembly, so by centering the piston with respect to the damper flange, engaging the damper flange on the transmission input shaft will shift the damper flange into central alignment, which will result in the piston becoming centered, due to the engagement of extension 424 with cover 416, which cover is supported in the radial direction by feature 423. Also, spline portion 422 of the damper flange is typically provided as a relatively thick component for transferring large amounts of torque to the transmission input shaft. Accordingly, the damper flange can be provided with a relatively large chamfered edge for accommodating for some misalignment between flange 420 and the transmission input shaft. Furthermore, piston 404 is sealed against the input shaft with seal 428, which can become damaged if the transmission input shaft collides into the seal during assembly when the seal is misaligned with respect to the input shaft. If the seal becomes damaged or fails, the piston, and therefore lockup clutch, can not operate properly.

Due to the relative ease with which seal 428 can become damaged during assembly and the severe consequences for failure of the seal, protection plate 430 may be additionally included. The protection plate is intended to protect the seal by creating a hard stop for the piston with respect to the input shaft. Thus, during installation, the piston is first partially centered by the damper due to extension 424 on the input plate affixed to the piston so that the protection plate is closely aligned with the input shaft. Then, the protection plate is engaged on the input shaft for providing further centering of the piston so that the seal is properly positioned for engagement with the transmission input shaft. As discussed above, extension 424 limits misalignment with axis A to distance X5, so the protection plate may be chamfered in order to accommodate this minor misalignment. As an additional benefit, since piston 404 is not affixed to cover 402, the piston tends to vibrate due to the operation of the torque converter and dampening performed by damper 406. This vibration can result in increased or uneven wear on the seal, which can ultimately lead to failure. Thus, protection plate 430 also acts as a hard stop for the piston against the transmission input shaft for limiting the wear the seal takes by vibrations in the torque converter.

Figure 6:
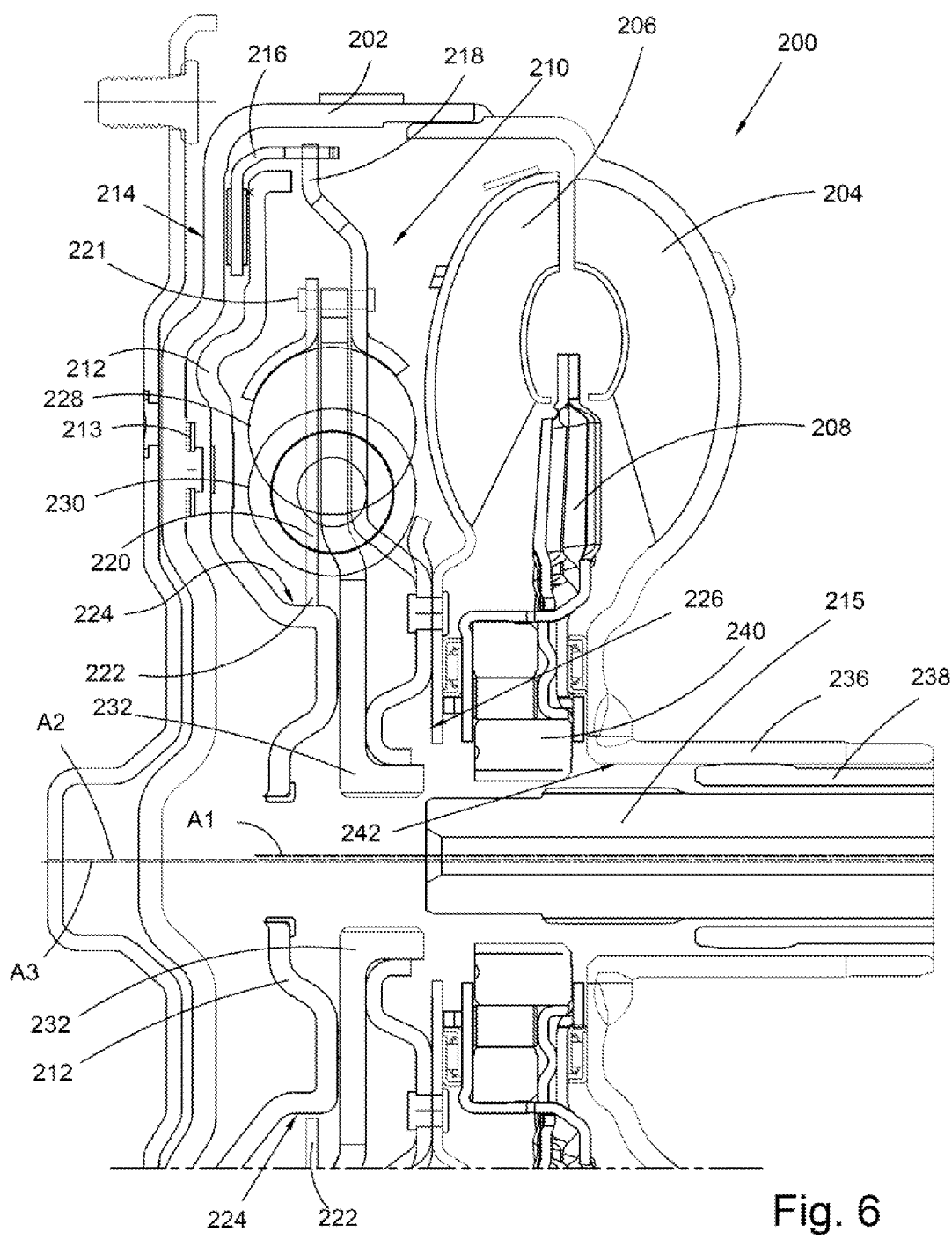
FIG. 6 is a cross-sectional view of the torque converter of FIG. 3 being installed onto a transmission input shaft.

FIG. 6 is provided for further explanation of the centering function of the centering features, namely extensions 30, 122, 222, and 322. Specifically, FIG. 6 illustrates torque converter 200, also shown in FIG. 3, but where the torque converter only partially installed on shaft 215. As shown, the torque converter is installed on the shaft by inserting the shaft into pump hub or tube 236. In this embodiment, the transmission also includes stator shaft 238 for locking stator 208 via stator hub 240. The arrangement of the stator shaft and transmission input shaft could be any known in the art, but generally, the input shaft is rotationally independent of the stator shaft, which is rotationally fixed, and both shafts are concentrically supported about a common axis.

In this embodiment, shafts 215 and 238 are concentrically arranged about axis A1. Cover 202 and piston 212, which is connected to the cover via leaf springs 213, are concentrically arranged along axis A2. Axis A3 represents the central axis for damper flange 232. It should be recognized that axis A, the axis of rotation of the torque converter and transmission input shaft in the fully assembled state, corresponds with axis A2. Thus, during installation, axes A1 and A3 will align themselves with axis A2 for forming axis A, which is commonly shared by all components.

For the sake of discussion, it is understood when viewing FIG. 6, that axes A1, A2, and A3 are arranged in the horizontal direction, while gravity is acting in a downward direction, with respect to the orientation of the figure. Accordingly, when placing torque converter 200 on shafts 215 and 238, the torque converter drops due to gravity, such that the stator shaft contacts the top portion of inner circumferential surface 242 of tube 236. This results in axis A1 of the input and stator shafts becoming slightly misaligned with respect to axis A2 of the torque converter cover and piston. Also due to gravity, it can be seen that damper 210 has dropped in the radial direction such that the top portion of extension 222 of cover 220 (that is, the portion of the extension located above the axes) has contacted against surface 224 of piston 212. Accordingly, it can be seen that this dropping in the radial direction due to gravity results in a widening of the gap between the bottom portion of extension 222 (that is, the portion of the extension located below the axes) and surface 224 of piston 212. By extending extension 222 to distance X3 from surface 224 of the piston, the radial dropping is limited to distance X3. Likewise, distance X3 also corresponds to the maximum distance that axis A3 of damper 210 will become misaligned with respect to axis A2 of the cover and piston. In this way, the extension minimizes the misalignment of the various components for easier assembly of the torque converter with the transmission input shaft. It should be understood that even though there is still some minor misalignment between axes A1, A2, and A3, this can be accommodated for by, for example, chamfering the edges of the input shaft, damper flange, stator shaft, and the various splines thereon. Furthermore, it should be understood that the extensions described with respect to the embodiments of FIGS. 1, 2, and 4 work in a similar manner to limit the radial dropping of the damper flange in order to limit the amount of misalignment between the axes during assembly.

It has been found that distances X1, X2, X3, X4, X5 work sufficiently well in the range of 0.5 mm-1.5 mm for commonly sized torque converters. For example, it would likely require manufacturing processes that are more precise than currently used processes to bring the extension any closer than 0.5 mm, because tolerances would have to be sufficiently reduced to avoid components inadvertently contacting each other during operation of the torque converter. Based on typical sizes and orientations of current torque converters, having a gap wider than 1.5 mm would probably not provide a sufficient amount of centering. However, it should be appreciated that smaller or larger distances could be used depending on the particular layout and manufacturing processes used for individual torque converters.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:
1. A torque converter, comprising:
a cover for receiving torsional input;
an impeller non-rotatably connected to the cover;
a turbine;
a damper including:
a first cover plate non-rotatably connected to the turbine;
a second cover plate:
non-rotatably connected to the first cover plate; and,
including an end furthest from an axis for the torque converter;

a flange arranged to non-rotatably connect to an input shaft via a splined connection between the flange and the input shaft; and, a plurality of springs engaged with the first and second cover plates and the flange and arranged to transfer torque between the first and second cover plates and the flange;

a lock-up clutch including:
  a clutch plate including a portion:
    parallel to the axis of rotation; and,
    non-rotatably connected to the first cover plate; and,
  a piston, separate from the clutch plate:
    arranged to displace in the axial direction to non-rotatably connect the cover and the clutch plate; and,
    including a portion located radially between the end of the second cover plate and the portion of the clutch plate; and,
  a gap, in a radial direction orthogonal to the axis, between the end of the second cover plate and the portion of the piston, wherein no component of the torque converter is located in the gap.

2. The torque converter recited in claim 1, wherein at least one leaf spring is secured between said piston and said cover for centering said piston with respect to said axis.

3. The torque converter recited in claim 1, wherein said piston is sealed directly against said transmission input shaft.

4. A torque converter, comprising:
a cover for receiving torsional input;
an impeller non-rotatably connected to the cover;
a turbine;
a damper including:
  a first cover plate non-rotatably connected to the turbine;
  a second cover plate:
    non-rotatably connected to the first cover plate; and,
    including an end closest to an axis for the torque converter;
  a flange arranged to non-rotatably connect to an input shaft via a splined connection between the flange and the input shaft;
  a plurality of springs engaged with the first and second cover plates and the flange and arranged to transfer torque between the first and second cover plates and the flange;
a lock-up clutch including:
  a clutch plate non-rotatably engaged with the first cover plate; and,
  a piston:
    arranged to displace in the axial direction to non-rotatably connect the cover and the clutch plate; and,
    including a portion extending in the axial direction; and,
  a gap, in a radial direction orthogonal to the axis, between the end of the second cover plate and the portion of the piston, wherein no component of the torque converter is located in the gap.

5. The torque converter of claim 4, wherein the piston plate is non-rotatably connected to the cover.

6. The torque converter of claim 4, wherein the piston plate includes an end:
  closest to the axis for the torque converter; and,
  arranged to engage the input shaft to center the piston plate with respect to the input shaft.

7. A torque converter, comprising:
a cover for receiving torsional input;
a lock-up clutch including:
  a piston displaceable in an axial direction, parallel to an axis for the torque converter, to non-rotatably connect the cover and the piston; and,
  a damper input plate:
    non-rotatably connected to the piston plate; and,
    including a portion extending away from the cover in the axial direction;
a damper including:
  a first cover plate;
  a second cover plate;
    non-rotatably connected to the first cover plate: and,
    including an end furthest from an axis for the torque converter;
  a flange including splines arranged to directly connect to an input shaft;
  at least one first spring engaged with the damper input plate and the first cover plate and arranged to transfer torque between the damper input plate and the first cover plate; and,
  at least one second spring engaged with the first and second cover plates and the flange; and,
  a gap, in a radial direction orthogonal to the axis, between the portion of the damper input plate and the end of the second cover plate, wherein no component of the torque converter is located in the gap.

8. The torque converter of claim 7, wherein the piston plate is rotatably with respect to the cover when the lock-up clutch is open.

9. The torque converter of claim 7, wherein:
the piston plate includes an end closest to the axis for the torque converter; and,
the lock-up clutch includes a seal in contact with the end of the piston plate and arranged to seal the piston plate against the input shaft.

10. The torque converter of claim 7, wherein the portion of the damper input plate is located between the at least one first and second springs in the radial direction.

11. The torque converter of claim 7, wherein the portion of the damper input plate is located beyond the flange in the radial direction.

* * * * *